United States Patent
Ge et al.

(10) Patent No.: US 12,275,152 B2
(45) Date of Patent: Apr. 15, 2025

(54) ROBOT STABILITY CONTROL METHOD, ROBOT AND COMPUTER-READABLE STORAGE MEDIUM

(71) Applicant: UBTECH ROBOTICS CORP LTD, Shenzhen (CN)

(72) Inventors: Ligang Ge, Shenzhen (CN); Yizhang Liu, Shenzhen (CN); Chunyu Chen, Shenzhen (CN); Qiuyue Luo, Shenzhen (CN); Jiangchen Zhou, Shenzhen (CN); Meng Yan, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 214 days.

(21) Appl. No.: 18/071,462

(22) Filed: Nov. 29, 2022

(65) Prior Publication Data

US 2023/0191604 A1     Jun. 22, 2023

(30) Foreign Application Priority Data

Dec. 17, 2021   (CN) .......................... 202111552534.1

(51) Int. Cl.
*G05B 19/4155*   (2006.01)
*B25J 9/16*   (2006.01)

(52) U.S. Cl.
CPC .......... *B25J 9/1664* (2013.01); *B25J 9/1605* (2013.01); *G05B 19/4155* (2013.01); *G05B 2219/50391* (2013.01)

(58) Field of Classification Search
CPC ...... B25J 9/1664; B25J 9/1605; B25J 9/1638; B25J 9/08; B25J 9/1602; B25J 9/1661; B25J 9/1679; G05B 19/4155; G05B 2219/50391; G05B 2219/40077; G05B 2219/40467

See application file for complete search history.

(56) References Cited

U.S. PATENT DOCUMENTS

| | | | |
|---|---|---|---|
| 2007/0241713 A1* | 10/2007 | Yamamoto | B62D 57/032 901/1 |
| 2011/0231050 A1* | 9/2011 | Goulding | G05D 1/0891 180/8.1 |

FOREIGN PATENT DOCUMENTS

| | | | |
|---|---|---|---|
| CN | 113400313 A | | 9/2021 |
| JP | 2008229845 A | * | 10/2008 |
| JP | 2015120419 A | * | 7/2015 |
| JP | 7549340 B2 | * | 9/2024 |
| KR | 20130019921 A | | 2/2013 |

* cited by examiner

*Primary Examiner* — Harry Y Oh

(57) ABSTRACT

A robot stability control method includes: obtaining a desired zero moment point (ZMP) and a fed-back actual ZMP of a robot at a current moment; based on a ZMP tracking control model, the desired ZMP and the actual ZMP, calculating a desired value of a motion state of a center of mass of the robot at the current moment, wherein the desired value of the motion state of the center of mass comprises a correction amount of the position of the center of mass; based on a spring-mass-damping-acceleration model and the desired value of the motion state of the center of mass, calculating a lead control input amount for the correction amount of the position of the center of mass; and controlling motion of the robot according to the lead control input amount and a planned value of the position of the center of mass at the current moment.

20 Claims, 13 Drawing Sheets

ROBOT STABILITY CONTROL METHOD, ROBOT AND COMPUTER-READABLE STORAGE MEDIUM

CROSS REFERENCE TO RELATED APPLICATIONS

This application claims priority to Chinese Patent Application No. CN 202111552534.1, filed Dec. 17, 2021, which is hereby incorporated by reference herein as if set forth in its entirety.

BACKGROUND

1. Technical Field

The present disclosure generally relates to robots, and particularly to a robot stability control method, a robot, and a computer-readable storage medium.

2. Description of Related Art

Legged robots are a complex mechanical system, which can control the position and pose of the feet and body by controlling the movement of joints. In the debugging process of robot walking control, it is found that due to the lag of joint tracking and the flexibility of mechanical mechanisms, there will be phase lag between the actual motion trajectory of the body of the robot and the desired motion trajectory of the body, as shown in FIG. 1, which will greatly affect the control effect of the controller of the robot and the stability of the robot.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
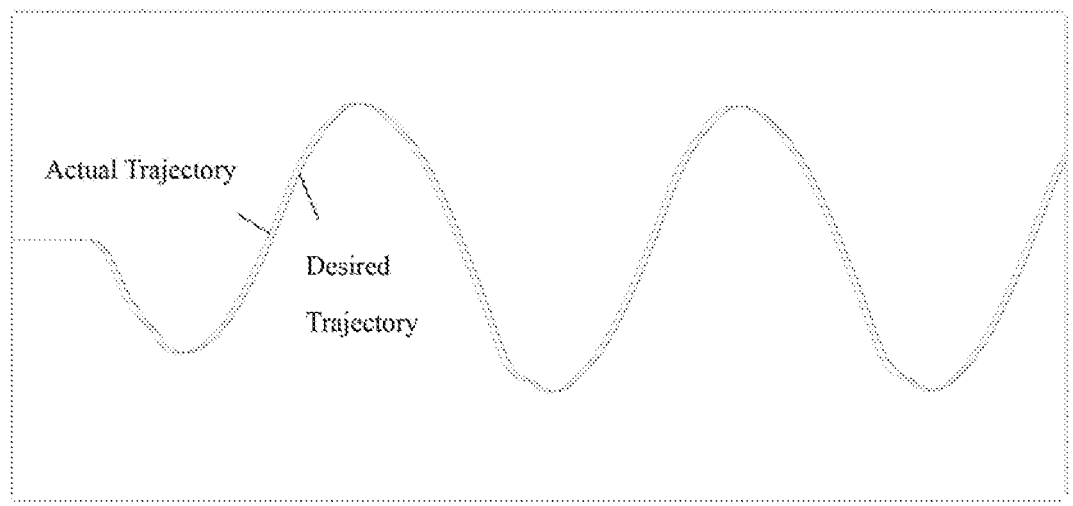
FIG. 1 shows the motion trajectory tracking curve of a conventional robot with phase lag.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Figure 2:
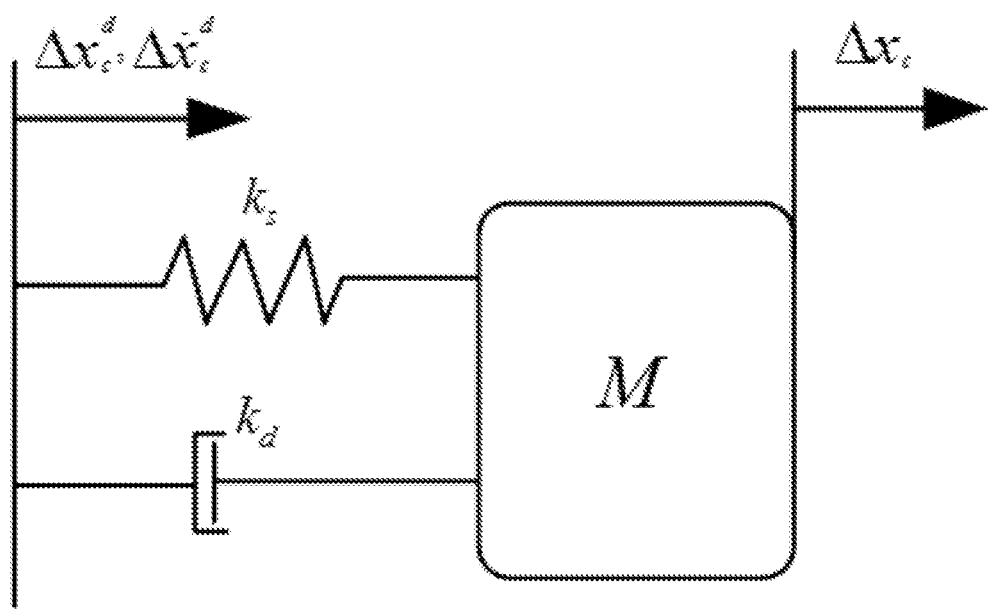
FIG. 2 shows a schematic diagram of a typical structure of a spring-mass-damper model.

FIG. 2 is a schematic diagram of a typical structure of a spring-mass-damper model. As a general physical model, the spring-mass-damping model can be used for mechanical vibration analysis or motion analysis in different scenarios, such as implementation of automobile shock absorbers, flexible force control of robotic arms, shock absorption of high-rise buildings, parachute falling and other fields. As shown in FIG. 2, the spring-mass-damping model includes a mass block, a spring and a damper structure connected to the mass block. According to Newton's second law, a force balance equation of the mass block can be built.

Figure 3:
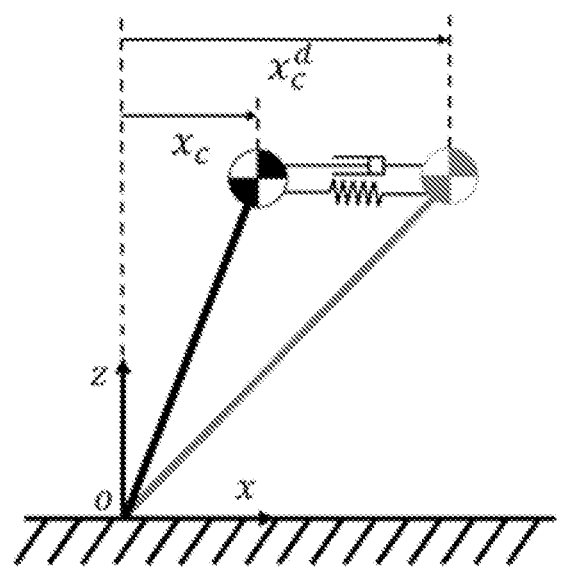
FIG. 3 shows a schematic diagram of the description of the phase lag characteristics based on the spring-mass-damper model.

As mentioned in the background above, in the process of robot stability control, there will be a phase lag between the actual motion trajectory and the desired motion trajectory of the body of the robot, and this characteristic of phase lag can be approximately described by the above-mentioned spring-mass-damping model, as shown in FIG. 3, in which $x_c^d$ represents the desired position of the center of mass, and $x_c$ represents the actual position of center of mass. Because the spring-mass-damper model is used for analysis and control, the problem of phase lag cannot be solved. The embodiments of the present disclosure propose a new physical model, that is, a spring-mass-damping-acceleration model. By introducing acceleration, the model can realize the lead input of the desired trajectory of the target object, which can greatly improve the tracking and response performance of the controller of a robot. The construction method of the spring-mass-damping-acceleration model will be described below.

Figure 4:
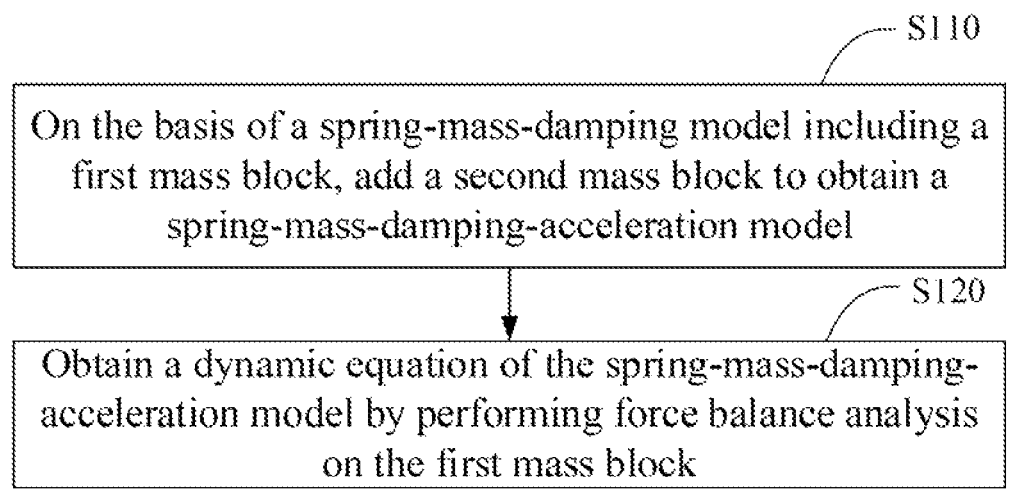
FIG. 4 shows a first flowchart of a method for constructing a spring-mass-damping-acceleration model according to one embodiment.

FIG. 4 shows a first flowchart of a method for constructing a spring-mass-damping-acceleration model according to one embodiment. Exemplarily, the method for constructing the spring-mass-damping-acceleration model may include steps S110 and S120.

Step S110: On the basis of a spring-mass-damping model including a first mass block, add a second mass block to obtain a spring-mass-damping-acceleration model. The second mass block and the desired acceleration of a target object are to generate a force on the first mass block.

The second mass block is a virtual block with a certain mass, which is mainly used for introducing acceleration. In one embodiment, the mass of the second mass block can be selected according to the actual situation. For example, the mass of the second mass block can be determined according to the deviation amount that needs to be input in advance, etc., which is not limited here. For example, in the stable walking control scenario of a robot, the mass of the second mass block can be determined according to the phase deviation between the desired trajectory input by the robot and the actual trajectory.

Figure 5:
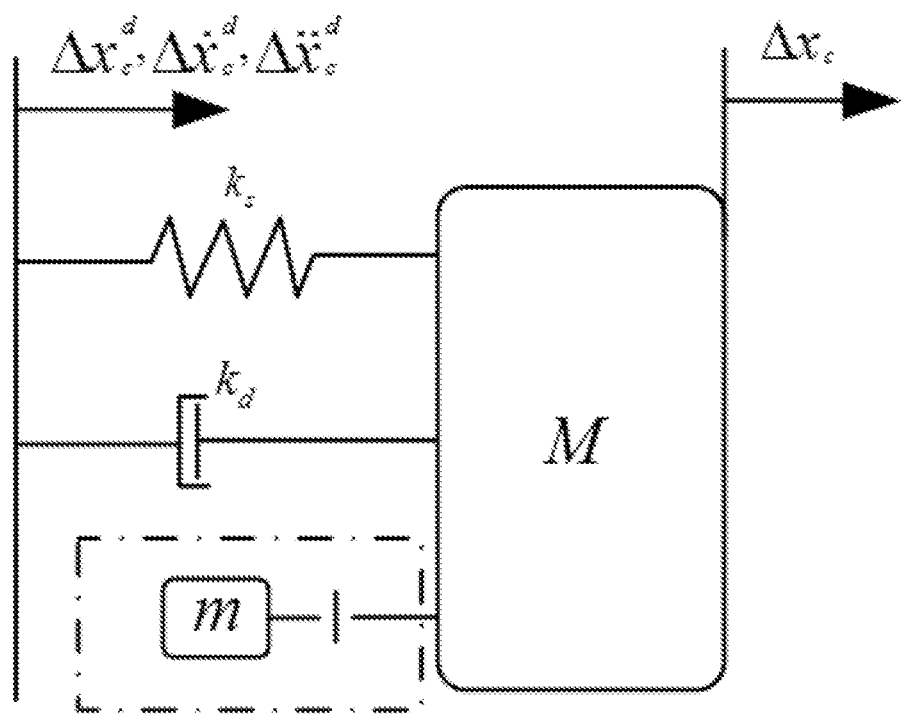
FIG. 5 shows a schematic structural diagram of a spring-mass-damping-acceleration model according to one embodiment.

Based on the above-mentioned spring-mass-damping model, as shown in FIG. 5, the force of the desired acceleration on the first mass block is introduced by adding another mass block to the spring-mass-damping model. Then, by using this force, the lead input amount of an input signal can be calculated, so as to realize the feedforward effect of the input signal. It can be understood that the feedforward of the signal is mainly calculated by using the input signal and has no connection with feedback signals.

Step S120: Obtain a dynamic equation of the spring-mass-damping-acceleration model by performing force balance analysis on the first mass block. The dynamic equation of the spring-mass-damping-acceleration model is to solve the lead control input amount of the position of a target object.

In the embodiment, in addition to the force from the spring and the damper, the first mass block is also subjected to the force from the second mass block. According to Newton's second law, the force balance equation of the first mass block can be obtained as follows: $F = k_s \times \Delta x_c^d + k_d \times \Delta \dot{x}_c^d + m \times \Delta \ddot{x}_c^d = M \times \Delta \ddot{x}_c$, where $\Delta x_{c_k}^d$, $\Delta \dot{x}_{c_k}^d$ and $\Delta \ddot{x}_{c_k}^d$ represent a desired position, a desired velocity and a desired acceleration, respectively, which are inputs to the spring-mass-damping-acceleration model; $k_s$ represents a stiffness coefficient of a spring; $k_d$ represents a damping coefficient of a damper; M and m represent a mass of the first mass block and a mass of the second mass block, respectively. The above-mentioned force balance equation is the dynamic equation of the spring-mass-damping-acceleration model. By solving the dynamic equation, the output of the model can be obtained. The output of the model in this embodiment is the lead input amount $\Delta x_c$ of the position of the target object.

Figure 6:
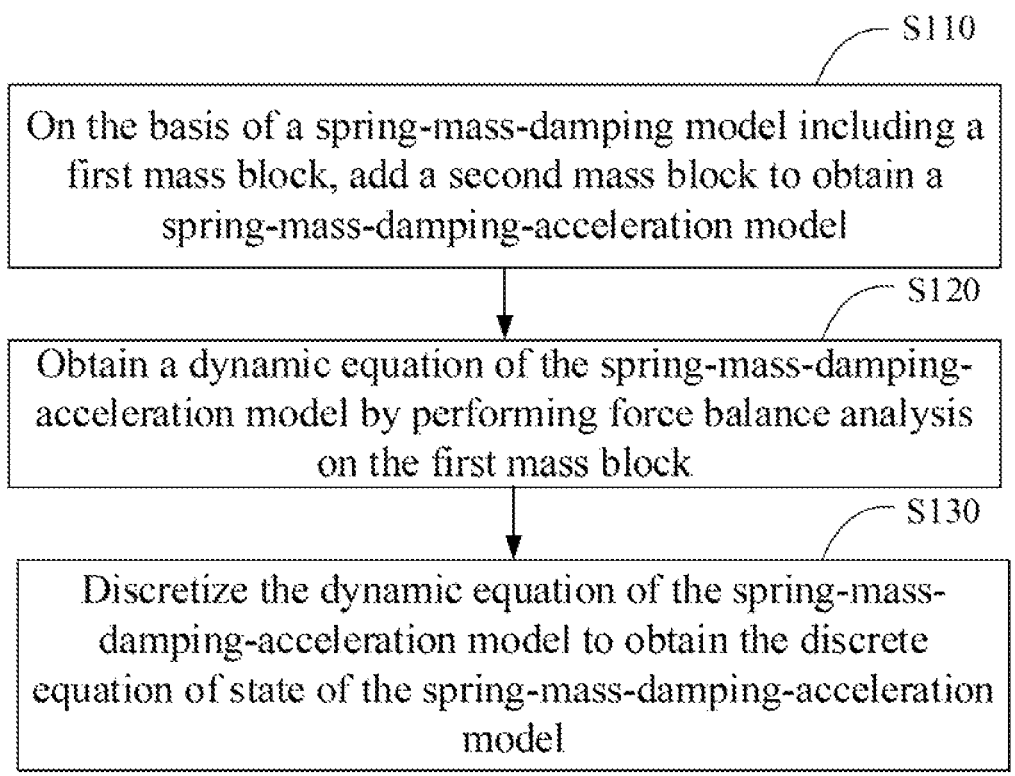
FIG. 6 shows a second flowchart of a method for constructing a spring-mass-damping-acceleration model according to one embodiment.

In one embodiment, since the continuous motion control of the target object is often realized sequentially in multiple consecutive control instruction cycles, discretization processing can be used to solve the above-mentioned dynamic equation. As shown in FIG. 6, the above-mentioned construction method may further include step S130.

Step S130: Discretize the dynamic equation of the spring-mass-damping-acceleration model to obtain the discrete equation of state of the spring-mass-damping-acceleration model. The discrete equation of state is to solve the lead input amount of the position of the target object at the corresponding time.

In one embodiment, the discrete equation of state is as follows: $F_k = k_s \times \Delta x_{c_k}^d + k_d \times \Delta \dot{x}_{c_k}^d + m \times \Delta \ddot{x}_{c_k}^d$, where $F_k$ represents the force on the center of mass of the robot at time k, $\Delta x_{c_k}^d$, $\Delta \dot{x}_{c_k}^d$ and $\Delta \ddot{x}_{c_k}^d$ represent a desired position, a desired velocity and a desired acceleration of the target object at time k, respectively.

For the lead input of the position at time k, it can be calculated according to the force at time k and the lead input of the position $\Delta x_{ck-1}$ at the previous moment. That is, $$\Delta x_{ck} = \Delta x_{ck-1} \times e^{(-k_s/k_d)*\Delta t} - \frac{F_k}{M} \times \frac{\left(e^{(-k_s/k_d)*\Delta t} - 1.0\right)}{k_s},$$

where, $\Delta x_{ck}$ and $\Delta x_{ck-1}$ represent the lead control input amount of the position at time k and time k−1, respectively, $\Delta t$ represents an interval time between time k and time k−1. For example, for robot motion control, $\Delta t$ can be one control instruction cycle, etc.

The embodiments of the present disclosure propose a new physical model, that is, a spring-mass-damping-acceleration model, through which the lead input amount $\Delta x_c$ of the input desired position $\Delta x_c^d$ can be calculated, so as to realize the lead input of input signals. It should be noted that the spring-mass-damping-acceleration model in the embodiments of the present disclosure is not limited to the scenario of robot motion control described in the embodiments below, but can be applied to any physical system with spring damping control characteristics, such as precise cutting by robotic arms, grinding trajectory tracking, vehicle transmission.

Based on the above-mentioned spring-mass-damping-acceleration model, the embodiments of the present disclosure further apply it to a specific scenario to verify the validity of the model. In one embodiment, the model can be applied to scenarios such as motion control of robots, precise grinding of industrial robotic arms, and cutting of surgical robots.

Figure 7:
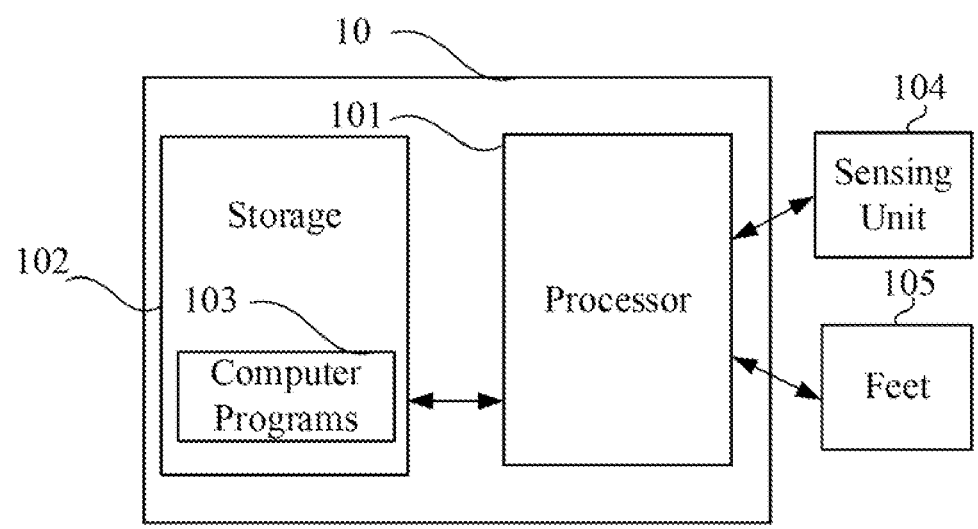
FIG. 7 shows a schematic block diagram of a robot according to one embodiment.

FIG. 7 shows a schematic block diagram of a robot 10 according to one embodiment. The robot 10 may include a processor 101, a storage 102, and one or more executable computer programs 103 that are stored in the storage 102. The storage 102 and the processor 101 are directly or indirectly electrically connected to each other to realize data transmission or interaction. For example, the storage 102 and the processor 101 can be electrically connected to each other through one or more communication buses or signal lines. The processor 101 performs corresponding operations by executing the executable computer programs 103 stored in the storage 102. When the processor 101 executes the computer programs 103, the steps in the embodiments of the method for controlling the robot 10, such as steps S210 to S240 in FIG. 8, steps S211 to S213 in FIG. 9, and steps S231 and S232 in FIG. 10 are implemented, which enables the robot to track the desired ZMP quickly and in real time, thereby greatly improving the walking stability of the robot.

The processor 101 may be an integrated circuit chip with signal processing capability. The processor 101 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like. The processor 101 can implement or execute the methods, steps, and logical blocks disclosed in the embodiments of the present disclosure.

The storage 102 may be, but not limited to, a random access memory (RAM), a read only memory (ROM), a programmable read only memory (PROM), an erasable programmable read-only memory (EPROM), and an electrical erasable programmable read-only memory (EEPROM). The storage 102 may be an internal storage unit of the robot 10, such as a hard disk or a memory. The storage 102 may also be an external storage device of the robot 10, such as a plug-in hard disk, a smart memory card (SMC), and a secure digital (SD) card, or any suitable flash cards. Furthermore, the storage 102 may also include both an internal storage unit and an external storage device. The storage 102 is used to store computer programs, other programs, and data required by the robot 10. The storage 102 can also be used to temporarily store data that have been output or is about to be output.

Figure 12:
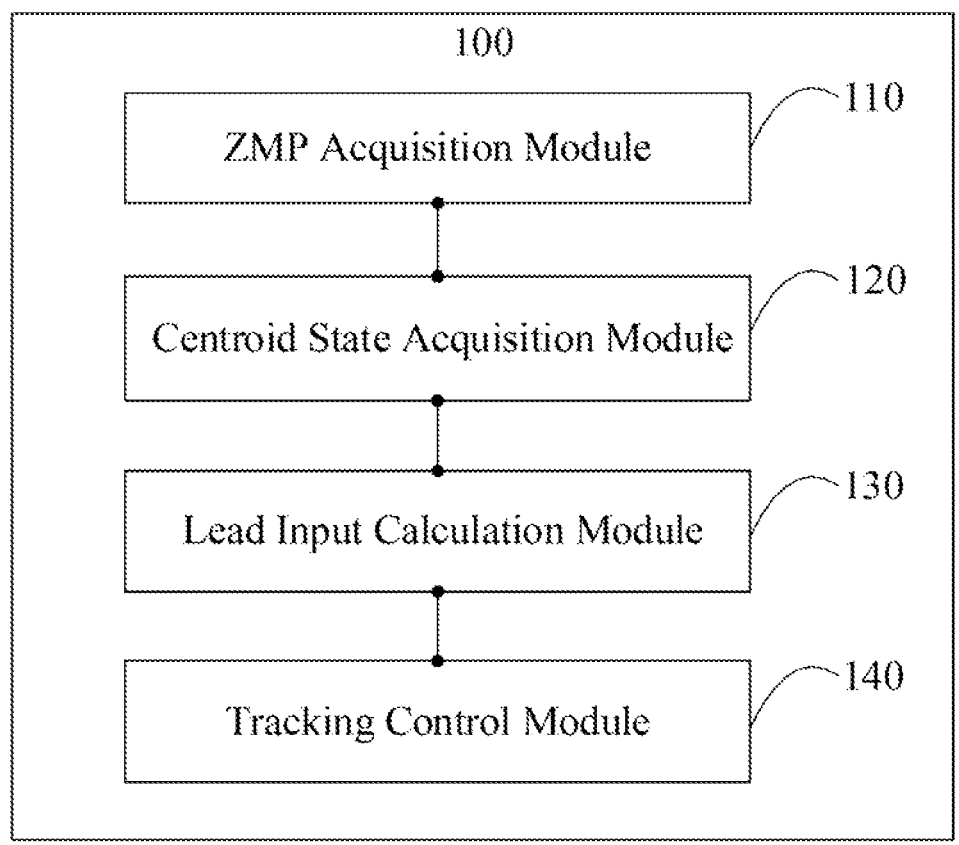
FIG. 12 shows a schematic block diagram of a robot stability control device according to one embodiment.

Exemplarily, the one or more computer programs 103 may be divided into one or more modules/units, and the one or more modules/units are stored in the storage 102 and executable by the processor 101. The one or more modules/units may be a series of computer program instruction segments capable of performing specific functions, and the instruction segments are used to describe the execution process of the one or more computer programs 103 in the robot 10. For example, the one or more computer programs 103 may be divided into a ZMP acquisition module 110, a centroid state acquisition module 120, a lead input calculation module 130, and a tracking control module 140 as shown in FIG. 12.

In one embodiment, the robot 10 may further include a sensing unit 104 that is electrically connected to the processor 101. The sensing unit 104 includes multiple sensors arranged on the robot. These sensors are to transmit necessary external information and their own state information to the robot's control system, thus providing necessary conditions for the robot's decision-making. In one embodiment, these sensors may include internal sensors and external sensors. The internal sensors are functional elements used to measure the robot's own state. Specifically, the internal sensors are to measure the kinematic and mechanical quantities. They are used for the robot to sense its own motion state, so that the robot can move according to the specified position, trajectory, speed and other parameters. For example, internal sensors include, but are not limited to, position or angle sensors, six axis force/torque sensors, and pose sensors arranged at corresponding joints or torso. For example, the position of the actual ZMP of the robot can be measured by six axis force/torque sensors or pressure sensors. External sensors are to detect the environment of the robot itself and the mutual information between itself and the environment, such as vision, force and other information. External sensors can include but not limited to proximity sensors, visual sensors, etc. It should be noted that these sensors listed above can be selected according to the actual application scenario of the robot.

In one embodiment, the robot 10 can be a humanoid robot having two feet 105, or a robot having three or more feet. If it is used for trajectory tracking, the robot can also be a mechanical arm, such as an industrial mechanical arm. In the case that the robot 10 is a biped robot, the robot includes a body and two mechanical leg structures connected to the waist of the body. The two mechanical leg structures are driven by corresponding joint motors for alternating movement, so as to realize the function similar to the alternating walking of human legs. It should be noted that the block diagram shown in FIG. 7 is only an example of the robot 10. The robot 10 may include more or fewer components than what is shown in FIG. 7, or have a different configuration than what is shown in FIG. 2. Each component shown in FIG. 7 may be implemented in hardware, software, or a combination thereof. It should be noted that in the walking process of the biped robot, the robot stability control method in the embodiments of the present disclosure can be used to achieve fast tracking of the desired ZMP trajectory.

Taking the ZMP (zero moment point) tracking control application scenario of biped robot as an example, in the process of robot walking, if the trajectory of the projection of the robot's center of gravity always falls on the support surface (e.g., ground), it is called stable. When the robot is stationary or in static balance, its ZMP coincides with the projection of the center of gravity on the ground. When the robot walks at a high speed, due to inertial force, the projection point of the center of gravity on the ground cannot always coincide with the ZMP. If the ZMP is outside the support area, the robot will fall. Therefore, if the ZMP is always in the right position, the robot can walk stably. In the embodiments of the present disclosure, the robot is controlled to move according to the pre-planned desired ZMP trajectory to maintain stable walking.

Based on the spring-mass-damping-acceleration model obtained by the construction method according to the embodiment above, the embodiments of the present disclosure apply this new model to the tracking control of the desired ZMP by the robot to, so as to realize the stable walking of the robot and improve the rapid response to external shocks.

Figure 8:
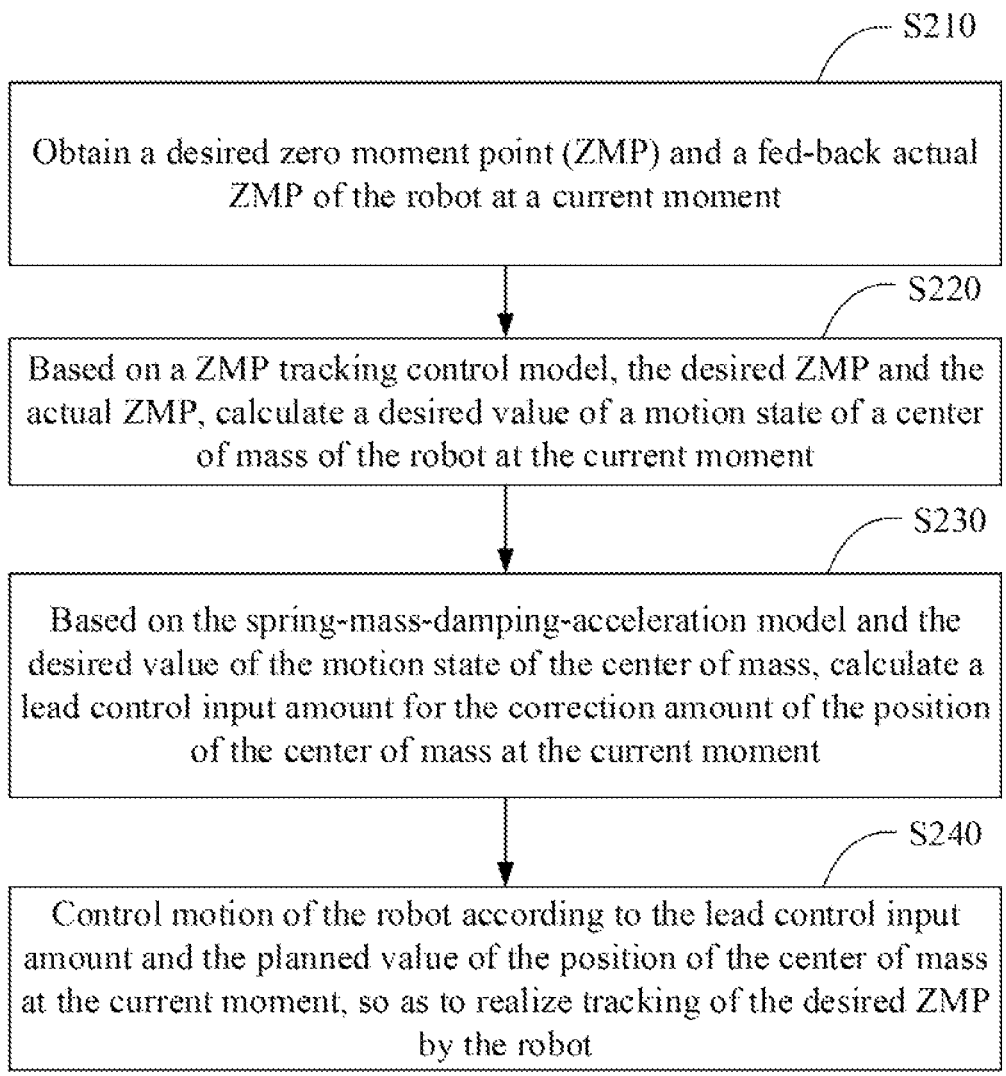
FIG. 8 shows a first flow chart of the robot stability control method according to one embodiment.

FIG. 8 is a first flow chart of a robot stability control method according to one embodiment. Exemplarily, the robot stability control method may include steps S210-S240.

Step S210: Obtain a desired zero moment point (ZMP) and a fed-back actual zero moment point of the robot at a current moment.

Here, the desired ZMP is a desired point that allows the robot to walk stably on the ground, which can be calculated by gait planning. The actual ZMP is an actual point when the robot is walking, which can be measured by a six-dimensional force/torque sensor or multiple pressure sensors. In one embodiment, by separately obtaining the desired ZMP and the actual ZMP at the corresponding moment, a ZMP difference can be calculated and obtained. Then, according to the ZMP difference and the relationship between the position of the center of mass of the robot and the ZMP, the position of the center of mass of the robot can be corrected, so that the actual ZMP of the robot is as close to the desired ZMP as possible.

Figure 9:
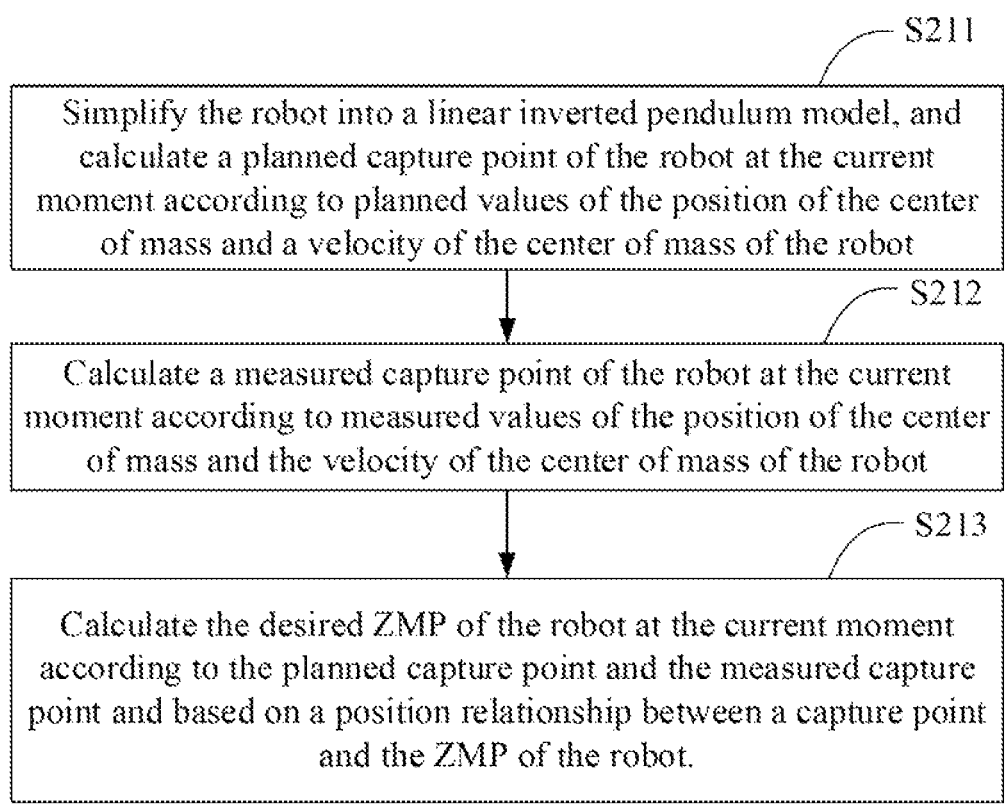
FIG. 9 shows a flow chart of a method for obtaining a desired ZMP according to one embodiment.
Figure 10:
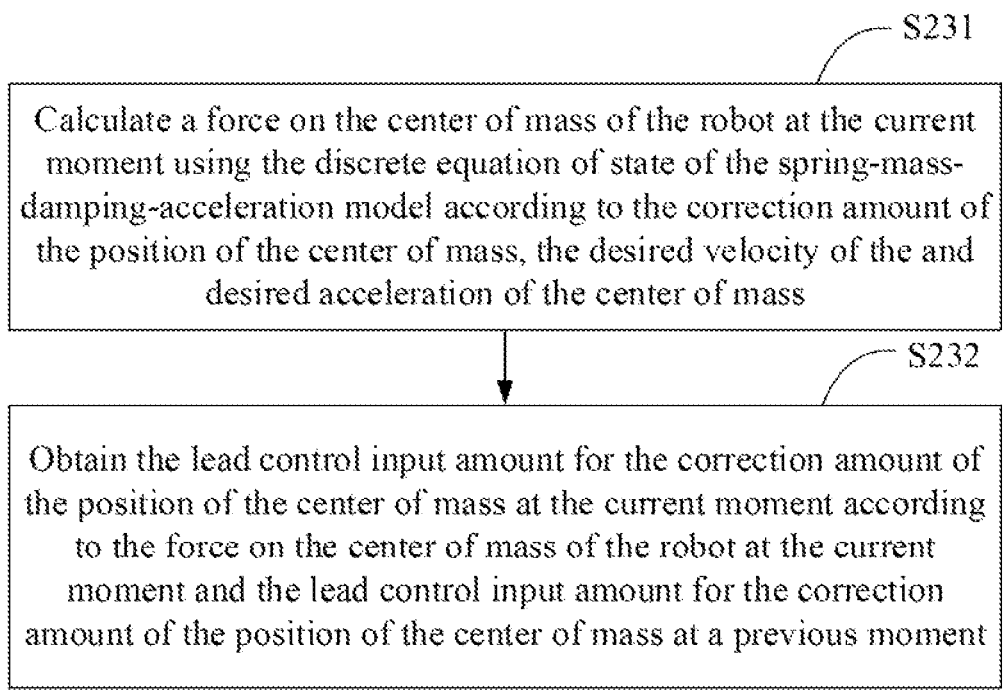
FIG. 10 shows a flow chart of a method for obtaining a lead control input amount according to one embodiment.

In one embodiment, as shown in FIG. 9, the acquisition of the desired ZMP of the robot at each moment may include steps S211 to S213.

Step S211: Simplify the robot into a linear inverted pendulum model, and calculate a planned capture point of the robot at the current moment according to planned values of the position of the center of mass and a velocity of the center of mass of the robot.

In the sagittal plane, the linear inverted pendulum model consists of a center of mass and a retractable light-weight leg. In this embodiment, the motion control of the robot's torso is equivalent to the trajectory control of the center of mass in this simplified model, and the two mechanical legs are respectively regarded as retractable links in the model.

Based on the linear inverted pendulum model, the following dynamic equation of the robot can be constructed in the sagittal plane. It can be understood that the dynamic equation also reflects the relationship between the center of mass and the ZMP. The dynamic equation is as follows: $\ddot{x}_c = \omega^2(x_c - p_x)$, where $$\omega = \sqrt{g/Z_c},$$

$\ddot{x}_c$ represents the acceleration of the center of mass, $x_c$ represents the position of the center of mass, $\omega$ represents the natural frequency of the linear inverted pendulum, which is a constant related to the height $Z_c$ of the center of mass of the linear inverted pendulum model, and g represents the gravitational constant.

The capture point is also referred to as the CP point. In the linear inverted pendulum model, it is a support point that can enables the inverted pendulum to be completely stationary. In other words, in the process of motion, if the robot steps on the CP point, the center of mass can be completely stationary, and for the robot, it can be in a state of static or dynamic balance.

According to the definition of the CP point, the position $\xi_x$ of the CP point, the position of center of mass $x_c$ and the velocity of center of mass $\dot{x}_c$ satisfy the following relationship:

$$\xi_x = x_c + \frac{\dot{x}_c}{\omega}.$$

It can be understood that the above-mentioned planned CP point can be calculated based on the planned position and velocity of the center of mass of the robot. Specifically, the equation for the calculation is as follows: $\xi_{plan}=x_{plan}+\dot{x}_{plan}/\omega$, where $\xi_{plan}$ represents the position of the planned CP point, $x_{plan}$ and $\dot{x}_{plan}$ represent the planned position of center of mass and planned velocity of center of mass, respectively.

Step S212: Calculate a measured capture point of the robot at the current moment according to measured values of the position of the center of mass and the velocity of the center of mass of the robot.

For the actual values of position of center of mass and velocity of center of mass, for example, they can be collected in real time and further estimated by sensing units such as the inertial measurement units (IMUs) arranged at the robot's torso and the six-dimensional force/torque sensors arranged at the corresponding ends. Similarly, according to the definition of the CP point, the measured capture point can be calculated using the relationship equation above according to the obtained measured values of the position of center of mass and velocity of center of mass. Specifically, the equation for the calculation is as follows: $\xi_{measure}=x_{measure}+\dot{x}_{measure}/\omega$, where $\xi_{measure}$ represents the position of the measured CP point, $x_{measure}$ and $\dot{x}_{measure}$ represent the measured position of center of mass and measured velocity of center of mass, respectively.

Step S213: Calculate the desired ZMP of the robot at the current moment according to the planned capture point and the measured capture point and based on a position relationship between a capture point and the ZMP of the robot.

The relationship between a capture point and the ZMP of the robot is determined according to a preset relationship between the capture point and the position of the center of mass of the robot and the above-mentioned dynamic equation of the linear inverted pendulum model. Specifically, by differentiating the equation relationship satisfied by the CP point and the position of center of mass, and then combining it with the above-mentioned dynamic equation, the following relationship between the CP point and the ZMP can be obtained: $\dot{\xi}_x=\omega(\xi_x-p_x)$.

Then, by solving the first-order differential equation and shifting transformation, and taking $\xi_x(t)$ as the planned CP point $\xi_{plan}$, and $\xi_x(0)$ as the fed-back CP point $\xi_{measure}$, the following equation for calculating the desired position of the ZMP can be obtained: $p_x=K_{cp_{control}}\xi_{plan}+(1-K_{cp_{control}})\xi_{measure}$, where $p_x$ represents the desired position of the ZMP (i.e., the above-mentioned desired ZMP), $K_{cp_{control}}$ is an adjustment parameter based on CP control obtained through the transformation of the above-mentioned equation, which can be used to adjust the tracking effect of the actual CP point on the planned CP point. After the desire ZMP and the actual ZMP at the current moment are obtained, the procedure goes to step S220.

Step S220: Based on a ZMP tracking control model, the desired ZMP and the actual ZMP, calculate a desired value of a motion state of a center of mass of the robot at the current moment.

The ZMP tracking control model is to realize the tracking of the position of the desired ZMP. In this embodiment, the ZMP tracking control model takes the desired ZMP and the fed-back actual ZMP as the input of the ZMP tracking control model, and takes the desired motion state of center of mass as the output. For example, the acceleration of center of mass may be used as the output, or the state such as the velocity of center of mass or the position of the center of mass may be used as the output. It can be understood that when different state parameters are selected as output, the structure of the ZMP tracking control model will also be adjusted accordingly, and correspondingly, the expression of the model will also change accordingly.

For example, in one embodiment, it can be constructed based on a P (proportional) controller, and use the acceleration of center of mass as the output of the model. At this time, the expression of the ZMP tracking control model is as follows:

$$\ddot{x}_{zmp} = K_{zmp}\frac{g}{Z_c}(p_x - p_m).$$

where $\ddot{x}_{zmp}$ represents the desired acceleration of center of mass when tracking the desired ZMP, and $K_{zmp}$ represents the adjustment coefficient of the ZMP tracking control model.

It should be noted that the ZMP tracking control model constructed in this embodiment only needs to be able to establish the connection between the relevant state of the center of mass and the desired ZMP, so as to realize the tracking effect of the desired ZMP. The specific expression of the model is not limited to the example above. In addition to being constructed based on the P controller, for example, the ZMP tracking control model can also be constructed based on other types of controllers such as PI (proportional-integral), PI (proportional-derivative), PID (proportional-integral-derivative), etc., which is not limited here.

In one embodiment, the desired value of the motion state of the center of mass may include the desired acceleration of center of mass, the desired velocity of center of mass, and a desired correction amount of the position of the center of mass. For these different desired values, the ZMP tracking control model can be used to calculate the desired acceleration of center of mass according to the difference between the desired ZMP and the actual ZMP. Then, the desired acceleration of center of mass is integrated once to obtain the desired velocity of center of mass. The desired acceleration of center of mass is integrated twice to obtain the correction amount of the position of the center of mass.

Taking the above-mentioned ZMP tracking control model with the acceleration of center of mass as the output as an example, the desired ZMP and the actual ZMP obtained in step S100 can be substituted into the above-mentioned model expression, and the desired acceleration of center of mass $\ddot{x}_{zmp}$ at the current moment can be directly calculated.

For the desired velocity of center of mass $\dot{x}_{zmp}$ and the correction amount of the position of the center of mass $\Delta X$, based on the same ZMP tracking control model, the desired acceleration of center of mass can be further integrated twice to obtain the desired velocity of center of mass and correction amount of the position of the center of mass respectively. It should be understood that, in this embodiment, the trajectory of the position of the center of mass of the robot is first planned, and the trajectory of the position of the center of mass is used to obtain the desired ZMP trajectory based on CP control. However, the conversion between ZMP, CP point and the position of the center of mass will introduce errors, resulting in a difference between the actual position of center of mass and the planned position of center of mass. Therefore, when ZMP tracking is performed in embodiments of the present disclosure, the change amount of the position of center of mass is calculated to correct the planned position of center of mass. The calculated change amount is also called the correction amount of the position of the center of mass.

In one embodiment, the following equation for calculating the velocity of center of mass can be obtained by integrating and discretizing the above-mentioned acceleration of center of mass: $\dot{x}_{zmp(k)}=\dot{x}_{zmp(k-1)}+\ddot{x}_{zmp(k)}\Delta t$, where $\dot{x}_{zmp(k)}$ is the desired velocity of center of mass at time k when tracking the desired ZMP, $\dot{x}_{zmp(k-1)}$ is the desired velocity of center of mass at time k−1, and $\ddot{x}_{zmp(k)}$ is the desired acceleration of the center of mass at time k.

In one embodiment, by integrating the above-mentioned acceleration of center of mass twice, or by integrating the velocity of center of mass, and performing discretization processing, the following calculation equation for the change amount of the position of center of mass can be obtained: $\Delta X(k)=\Delta X(k-1)+\dot{x}_{zmp(k)}+\Delta t+0.5\ddot{x}_{zmp(k)}\Delta t$, where $\Delta X(k)$ and $\Delta X(k-1)$ are the change amounts in the position of the center of mass at time k and time k−1, respectively.

There is a phase lag between the desired motion trajectory and the actual motion trajectory of the robot, and the main reason for this phenomenon is that the mechanical mechanisms of the robot have motion inertia. In this regard, in this embodiment, after obtaining the correction amount of the position of the center of mass, the spring-mass-damping-acceleration model obtained according to the above-mentioned construction method will be used to realize the lead input of the correction amount of the position of the center of mass, so as to solve the problem of phase deviation. Finally, according to the planned position of the center of mass and the correction amount with the lead input, the position of the center of mass for actual control can be calculated.

Step S230: Based on the spring-mass-damping-acceleration model and the desired value of the motion state of the center of mass, calculate a lead control input amount for the correction amount of the position of the center of mass at the current moment.

Here, the lead control input amount is the correction amount of the position of center of mass with lead input. In the embodiment, the solved desired value of the motion state of the center of mass is used as the input of the spring-mass-damping-acceleration model, and a lead control input amount for the correction amount of the position of the center of mass is used as the output to calculate the lead control input.

In one embodiment, the above-mentioned discrete equation of state of the spring-mass-damping-acceleration model can be used to calculate the lead control input amount for the correction amount of the position of the center of mass at the current moment. As shown in FIG. 10, step S230 may include steps S231 to S232.

Step S231: Calculate a force on the center of mass of the robot at the current moment using the discrete equation of state of the spring-mass-damping-acceleration model according to the correction amount of the position of the center of mass, the desired velocity of the and desired acceleration of the center of mass.

In one embodiment, the solved correction amount of the position of center of mass position $\Delta X(k)$ is used as the desired position $\Delta x_{c_k}^d$ in the discrete equation of state, the desired velocity of center of mass $\dot{x}_{zmp(k)}$ is used as the desired velocity $\Delta \dot{x}_{c_k}^d$ in the discrete equation of state, the desired acceleration of center of mass $\ddot{x}_{zmp(k)}$ is used as the desired acceleration $\Delta \ddot{x}_{c_k}^d$ in the discrete equation of state, which are substituted into the following equation: $F_k=k_s\times\Delta x_{c_k}^d+k_d\times\Delta \dot{x}_{c_k}^d+m\times\Delta \ddot{x}_{c_k}^d$. The force on the center of mass of the robot at the current moment can then be calculated.

Step S232: Obtain the lead control input amount for the correction amount of the position of the center of mass at the current moment according to the force on the center of mass of the robot at the current moment and the lead control input amount for the correction amount of the position of the center of mass at a previous moment.

Then, based on the force $F_k$ on the center of mass of the robot at the time k and the lead control input amount $\Delta x_{c_{k-1}}$ at the time k−1, the lead control input amount $\Delta x_{c_k}$ at the time k can be calculated using the following equation:

$$\Delta x_{ck} = \Delta x_{ck-1} \times e^{(-k_s/k_d)*\Delta t} - \frac{F_k}{M} \times \frac{(e^{(-k_s/k_d)*\Delta t} - 1.0)}{k_s}.$$

Step S240: Control motion of the robot according to the lead control input amount and the planned value of the position of the center of mass at the current moment, so as to realize tracking of the desired ZMP by the robot.

After obtaining the lead control input amount $\Delta x_c$ at the current moment, the final position of center of mass at the current moment can be obtained by correcting the planned position of center of mass according to the following equation: $x_c=x_{plan}+\Delta x_c$, where $x_c$ is the corrected position of with lead input, and $x_{plan}$ is planned position of center of mass. The joint motors of the robot are controlled correspondingly with $x_c$ as the final desired position of the center of mass, so that the robot can move according to the generated desired ZMP trajectory and achieve stable walking.

Figure 11:
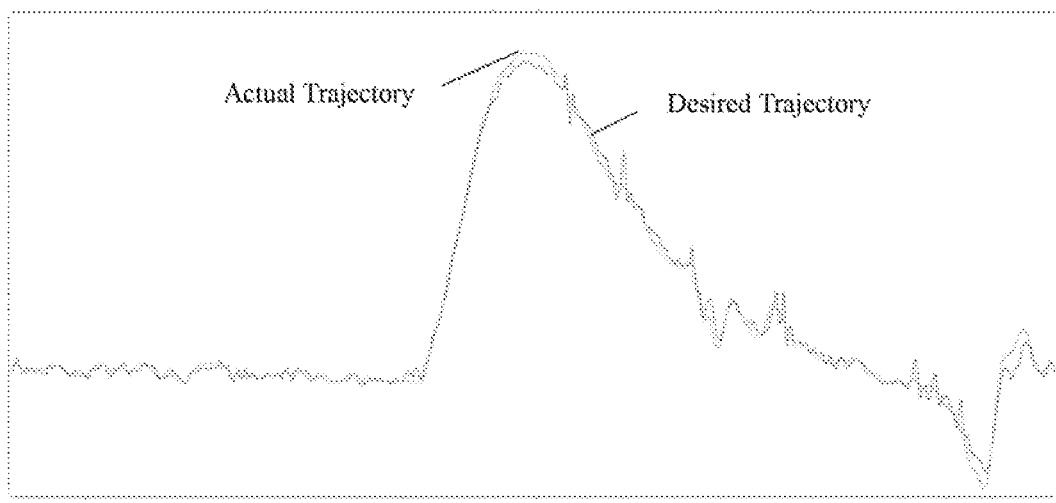
FIG. 11 shows a ZMP tracking curve based on the spring-mass-damping-acceleration model.

In the embodiments of the present disclosure, the desired trajectory of the ZMP is generated in real time based on CP control, and the position of the center of mass of the robot is corrected while the desired ZMP is calculated. Then the constructed spring-mass-damping-acceleration model is used to calculate the lead input amount for the correction amount of the position of the center of mass, so as to realize the feedforward input of the trajectory of the center of mass. The feedforward input improves the real-time performance of the robot control, and effectively solves the problem of the phase deviation between the actual motion trajectory and the desired motion trajectory of the robot. As shown in FIG. 11, it can be seen from the ZMP tracking curve of the robot based on the spring-mass-damping-acceleration model that the robot achieves fast tracking of ZMP. In addition, since the robot can achieve fast tracking, it further enhances the impact resistance of the robot.

It should be understood that sequence numbers of the foregoing processes do not mean an execution sequence in this embodiment of this disclosure. The execution sequence of the processes should be determined according to functions and internal logic of the processes, and should not be construed as any limitation on the implementation processes of this embodiment of this disclosure.

Referring to FIG. 12, in one embodiment, a robot stability control device 100 may include a ZMP acquisition module 110, a centroid state acquisition module 120, a lead input calculation module 130, and a tracking control module 140. The ZMP acquisition module 110 is to obtain a desired zero moment point (ZMP) and a fed-back actual zero moment point of the robot at a current moment. The centroid state acquisition module 120 is to, based on a ZMP tracking control model, the desired ZMP and the actual ZMP, calculate a desired value of a motion state of a center of mass of the robot at the current moment. The desired value of the motion state of the center of mass includes a correction amount of the position of the center of mass. The lead input calculation module 130 is to, based on a spring-mass-damping-acceleration model and the desired value of the motion state of the center of mass, calculate a lead control input amount for the correction amount of the position of the center of mass. The tracking control module 140 is to control motion of the robot according to the lead control input amount and a planned value of the position of the center of mass at the current moment, so as to realize tracking of the desired ZMP by the robot.

Figure 13:
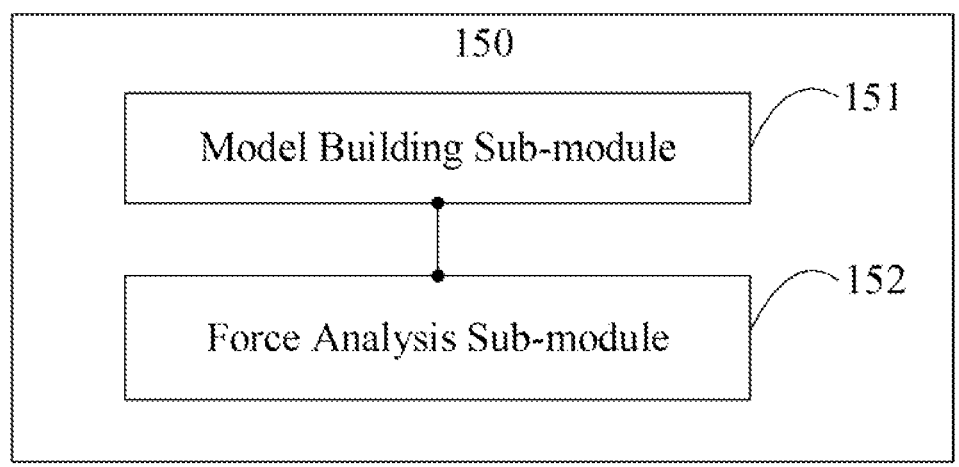
FIG. 13 shows a schematic block diagram of a model building module according to one embodiment.

In one embodiment, the robot stability control device 100 may further include a model building module 150 for building the above-mentioned spring-mass-damping-acceleration model. As shown in FIG. 13, the model building module 150 includes a model building sub-module 151 and a force analysis sub-module 152. The above-mentioned spring-mass-damping-acceleration model can also be pre-built and stored in the lead input calculation module 130 for direct calling, which is not limited here.

The model building sub-module 151 is to add a second mass block to a spring-mass-damping model including a first mass block to obtain a spring-mass-damping-acceleration model. The second mass block and a desired acceleration are to generate a force on the first mass block.

The force analysis sub-module 152 is to perform force balance analysis on the first mass block to obtain the dynamic equation of the spring-mass-damping-acceleration model. The dynamic equation of the spring-mass-damping-acceleration model is to calculate the lead input amount of the position of the target object. It can be understood that, in this embodiment, the dynamic equation of the spring-mass-damping-acceleration model is to calculate the lead control input amount for the correction amount of the position of the center of mass when the robot performs ZMP tracking.

It should be noted that content such as information exchange between the modules/units and the execution processes thereof is based on the same idea as the method embodiments of the present disclosure, and produces the same technical effects as the method embodiments of the present disclosure. For the specific content, refer to the foregoing description in the method embodiments of the present disclosure. Details are not described herein again.

Another aspect of the present disclosure is directed to a device, such as a computer. The device may include a processor and a memory. The memory stores a computer program, and the processor executes the computer program so that the device executes the above-mentioned method for constructing a spring-mass-damping-acceleration model.

Another aspect of the present disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It should be understood that the disclosed device and method can also be implemented in other manners. The device embodiments described above are merely illustrative. For example, the flowcharts and block diagrams in the accompanying drawings illustrate the architecture, functionality and operation of possible implementations of the device, method and computer program product according to embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition, functional modules in the embodiments of the present disclosure may be integrated into one independent part, or each of the modules may be independent, or two or more modules may be integrated into one independent part. in addition, functional modules in the embodiments of the present disclosure may be integrated into one independent part, or each of the modules may exist alone, or two or more modules may be integrated into one independent part. When the functions are implemented in the form of a software functional unit and sold or used as an independent product, the functions may be stored in a computer-readable storage medium. Based on such an understanding, the technical solutions in the present disclosure essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard, disk, a read-only memory (ROM), a random access memory (RAM), a magnetic disk, or an optical disc.

A person skilled in the art can clearly understand that for the purpose of convenient and brief description, for specific working processes of the device, modules and units described above, reference may be made to corresponding processes in the embodiments of the foregoing method, which are not repeated herein.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing various embodiments, or make equivalent substitutions on partial technical features; however, these modifications or substitutions do not make the nature of the corresponding technical solution depart from the spirit and scope of technical solutions of various embodiments of the present disclosure, and all should be included within the protection scope of the present disclosure.

What is claimed is:

1. A computer-implemented robot stability control method, comprising:
    obtaining a desired zero moment point (ZMP) and a fed-back actual ZMP of a robot at a current moment;
    based on a ZMP tracking control model, the desired ZMP and the actual ZMP, calculating a desired value of a motion state of a center of mass of the robot at the current moment, wherein the desired value of the motion state of the center of mass comprises a correction amount of the position of the center of mass, and wherein the ZMP tracking control model takes the desired ZMP and the actual ZMP as an input of the ZMP tracking control model, and takes the desired value of the motion state of the center of mass as an output;
    based on a spring-mass-damping-acceleration model and the desired value of the motion state of the center of mass, calculating a lead control input amount for the correction amount of the position of the center of mass; and
    controlling motion of the robot according to the lead control input amount and a planned value of the position of the center of mass at the current moment, so as to realize tracking of the desired ZMP by the robot;
    wherein the spring-mass-damping-acceleration model is created by adding a second mass block to a spring-mass-damping model that includes a first mass block, the second mass block and a desired acceleration are configured to generate a force on the first mass block; a dynamic equation of the spring-mass-damping-acceleration model is obtained by performing force balance analysis on the first mass block, the dynamic equation of the spring-mass-damping-acceleration model is configured to calculate the lead control input amount for the correction amount of the position of the center of mass when the robot performs ZMP tracking.

2. The method of claim 1, wherein the desired value of the motion state of the center of mass further comprises a desired velocity of the center of mass and a desired acceleration of the center of mass; calculating the lead control input amount for the correction amount of the position of the center of mass based on the spring-mass-damping-acceleration model and the desired value of the motion state of the center of mass comprises:
calculating a force on the center of mass of the robot at the current moment using a discrete equation of state of the spring-mass-damping-acceleration model according to the correction amount of the position of the center of mass, the desired velocity of the center of mass and desired acceleration of the center of mass, wherein the discrete equation of state is obtained by discretizing the dynamic equation of the spring-mass-damping-acceleration model; and
obtaining the lead control input amount for the correction amount of the position of the center of mass at the current moment according to the force on the center of mass of the robot at the current moment and the lead control input amount for the correction amount of the position of the center of mass at a previous moment.

3. The method of claim 2, wherein the discrete equation of state is as follows: $F_k = k_s \times \Delta x_{c_k}^d + k_d \times \Delta \dot{x}_{c_k}^d + m \times \Delta \ddot{x}_{c_k}^d$;

$$\Delta x_{ck} = \Delta x_{ck-1} \times e^{(-k_s/k_d)*\Delta t} - \frac{F_k}{M} \times \frac{\left(e^{(-k_s/k_d)*\Delta t} - 1.0\right)}{k_s},$$

where $F_k$ represents the force on the center of mass of the robot at time k, $k_s$, $k_d$, M and m represent a stiffness coefficient of a spring, a damping coefficient of a damper, a mass of the first mass block and a mass of the second mass block, respectively, $\Delta x_{c_k}^d$, $\Delta \dot{x}_{c_k}^d$ and $\Delta \ddot{x}_{c_k}^d$ represent a desired position, the desired velocity and the desired acceleration of the center of mass at time k, respectively, $\Delta x_{c_k}$ and $\Delta x_{c_{k-1}}$, represent the lead control input amount of the position of the center of mass at time k and time k−1, respectively, $\Delta t$ represents an interval time between time k and time k−1.

4. The method of claim 1, wherein obtaining the desired ZMP of the robot at the current moment comprises:
simplifying the robot into a linear inverted pendulum model, and calculating a planned capture point of the robot at the current moment according to planned values of the position of the center of mass and a velocity of the center of mass of the robot;
calculating a measured capture point of the robot at the current moment according to measured values of the position of the center of mass and the velocity of the center of mass of the robot; and
calculating the desired ZMP of the robot at the current moment according to the planned capture point and the measured capture point and based on a position relationship between a capture point and the ZMP of the robot, wherein the position relationship between the capture point and the ZMP of the robot is determined according to a preset relationship between the capture point and the position of the center of mass of the robot and a dynamic equation of the linear inverted pendulum model.

5. The method of claim 2, wherein calculating the desired value of the motion state of the center of mass of the robot at the current moment based on the ZMP tracking control model, the desired ZMP and the actual ZMP, comprises:
calculating the desired acceleration of the center of mass using the ZMP tracking control model according to a difference between the desired ZMP and the actual ZMP;
integrating the desired acceleration of the center of mass to obtain the desired velocity of the center of mass; and integrating the desired acceleration of the center of mass twice to obtain the correction amount of the position of the center of mass.

6. A robot comprising:
one or more processors; and
a memory coupled to the one or more processors, the memory storing programs that, when executed, cause the one or more processors to:
obtain a desired zero moment point (ZMP) and a fed-back actual ZMP of a robot at a current moment;
based on a ZMP tracking control model, the desired ZMP and the actual ZMP, calculate a desired value of a motion state of a center of mass of the robot at the current moment, wherein the desired value of the motion state of the center of mass comprises a correction amount of the position of the center of mass, and wherein the ZMP tracking control model takes the desired ZMP and the actual ZMP as an input of the ZMP tracking control model, and takes the desired value of the motion state of the center of mass as an output;
based on a spring-mass-damping-acceleration model and the desired value of the motion state of the center of mass, calculate a lead control input amount for the correction amount of the position of the center of mass; and
control motion of the robot according to the lead control input amount and a planned value of the position of the center of mass at the current moment, so as to realize tracking of the desired ZMP by the robot;
wherein the spring-mass-damping-acceleration model is created by adding a second mass block to a spring-mass-damping model that includes a first mass block, the second mass block and a desired acceleration are configured to generate a force on the first mass block; a dynamic equation of the spring-mass-damping-acceleration model is obtained by performing force balance analysis on the first mass block, the dynamic equation of the spring-mass-damping-acceleration model is configured to calculate the lead control input amount for the correction amount of the position of the center of mass when the robot performs ZMP tracking.

7. The robot of claim 6, wherein the desired value of the motion state of the center of mass further comprises a desired velocity of the center of mass and a desired acceleration of the center of mass; to calculate the lead control input amount for the correction amount of the position of the center of mass based on the spring-mass-damping-acceleration model and the desired value of the motion state of the center of mass, the programs, when executed, cause the one or more processors to:
calculate a force on the center of mass of the robot at the current moment using a discrete equation of state of the spring-mass-damping-acceleration model according to the correction amount of the position of the center of mass, the desired velocity of the center of mass and desired acceleration of the center of mass, wherein the discrete equation of state is obtained by discretizing the dynamic equation of the spring-mass-damping-acceleration model; and
obtain the lead control input amount for the correction amount of the position of the center of mass at the current moment according to the force on the center of mass of the robot at the current moment and the lead control input amount for the correction amount of the position of the center of mass at a previous moment.

8. The robot of claim 7, wherein the discrete equation of state is as follows: $F_k = k_s \times \Delta x_{c_k}^d + k_d \times \Delta \dot{x}_{c_k}^d + m \times \Delta \ddot{x}_{c_k}^d$;

$$\Delta x_{ck} = \Delta x_{ck-1} \times e^{(-k_s/k_d)*\Delta t} - \frac{F_k}{M} \times \frac{\left(e^{(-k_s/k_d)*\Delta t} - 1.0\right)}{k_s},$$

where $F_k$ represents the force on the center of mass of the robot at time k, $k_s$, $k_d$, M and m represent a stiffness coefficient of a spring, a damping coefficient of a damper, a mass of the first mass block and a mass of the second mass block, respectively, $\Delta x_{c_k}^d$, $\Delta \dot{x}_{c_k}^d$ and $\Delta \ddot{x}_{c_k}^d$ represent a desired position, the desired velocity and the desired acceleration of the center of mass at time k, respectively, $\Delta x_{c_k}$ and $\Delta x_{c_{k-1}}$ represent the lead control input amount of the position of the center of mass at time k and time k−1, respectively, $\Delta t$ represents an interval time between time k and time k−1.

9. The robot of claim 6, wherein to obtain the desired ZMP of the robot at the current moment, the programs, when executed, cause the one or more processors to:
    simplify the robot into a linear inverted pendulum model, and calculate a planned capture point of the robot at the current moment according to planned values of the position of the center of mass and a velocity of the center of mass of the robot;
    calculate a measured capture point of the robot at the current moment according to measured values of the position of the center of mass and the velocity of the center of mass of the robot; and
    calculate the desired ZMP of the robot at the current moment according to the planned capture point and the measured capture point and based on a position relationship between a capture point and the ZMP of the robot, wherein the position relationship between the capture point and the ZMP of the robot is determined according to a preset relationship between the capture point and the position of the center of mass of the robot and a dynamic equation of the linear inverted pendulum model.

10. The robot of claim 7, wherein to calculate the desired value of the motion state of the center of mass of the robot at the current moment based on the ZMP tracking control model, the desired ZMP and the actual ZMP, the programs, when executed, cause the one or more processors to:
    calculate the desired acceleration of the center of mass using the ZMP tracking control model according to a difference between the desired ZMP and the actual ZMP;
    integrate the desired acceleration of the center of mass to obtain the desired velocity of the center of mass; and
    integrate the desired acceleration of the center of mass twice to obtain the correction amount of the position of the center of mass.

11. A non-transitory computer-readable storage medium storing instructions that, when executed by at least one processor, cause the at least one processor to perform a robot stability control method, the method comprising:
    obtaining a desired zero moment point (ZMP) and a fed-back actual ZMP of a robot at a current moment;
    based on a ZMP tracking control model, the desired ZMP and the actual ZMP, calculating a desired value of a motion state of a center of mass of the robot at the current moment, wherein the desired value of the motion state of the center of mass comprises a correction amount of the position of the center of mass, and wherein the ZMP tracking control model takes the desired ZMP and the actual ZMP as an input of the ZMP tracking control model, and takes the desired value of the motion state of the center of mass as an output;
    based on a spring-mass-damping-acceleration model and the desired value of the motion state of the center of mass, calculating a lead control input amount for the correction amount of the position of the center of mass; and
    controlling motion of the robot according to the lead control input amount and a planned value of the position of the center of mass at the current moment, so as to realize tracking of the desired ZMP by the robot;
    wherein the spring-mass-damping-acceleration model is created by adding a second mass block to a spring-mass-damping model that includes a first mass block, the second mass block and a desired acceleration are configured to generate a force on the first mass block; a dynamic equation of the spring-mass-damping-acceleration model is obtained by performing force balance analysis on the first mass block, the dynamic equation of the spring-mass-damping-acceleration model is configured to calculate the lead control input amount for the correction amount of the position of the center of mass when the robot performs ZMP tracking.

12. The non-transitory computer-readable storage medium of claim 11, wherein the desired value of the motion state of the center of mass further comprises a desired velocity of the center of mass and a desired acceleration of the center of mass; calculating the lead control input amount for the correction amount of the position of the center of mass based on the spring-mass-damping-acceleration model and the desired value of the motion state of the center of mass comprises:
    calculating a force on the center of mass of the robot at the current moment using a discrete equation of state of the spring-mass-damping-acceleration model according to the correction amount of the position of the center of mass, the desired velocity of the center of mass and desired acceleration of the center of mass, wherein the discrete equation of state is obtained by discretizing the dynamic equation of the spring-mass-damping-acceleration model; and
    obtaining the lead control input amount for the correction amount of the position of the center of mass at the current moment according to the force on the center of mass of the robot at the current moment and the lead control input amount for the correction amount of the position of the center of mass at a previous moment.

13. The non-transitory computer-readable storage medium of claim 12, wherein the discrete equation of state is as follows: $F_k = k_s \times \Delta x_{c_k}^d + k_d \times \Delta \dot{x}_{c_k}^d + m \times \Delta \ddot{x}_{c_k}^d$;

$$\Delta x_{ck} = \Delta x_{ck-1} \times e^{(-k_s/k_d)*\Delta t} - \frac{F_k}{M} \times \frac{\left(e^{(-k_s/k_d)*\Delta t} - 1.0\right)}{k_s},$$

where $F_k$ represents the force on the center of mass of the robot at time k, $k_s$, $k_d$, M and m represent a stiffness coefficient of a spring, a damping coefficient of a damper, a mass of the first mass block and a mass of the second mass block, respectively, $\Delta x_{c_k}^d$, $\Delta \dot{x}_{c_k}^d$ and $\Delta \ddot{x}_{c_k}^d$ represent a desired position, the desired velocity and the desired acceleration of the center of mass at time k, respectively, $\Delta x_{c_k}$ and $\Delta x_{c_{k-1}}$ represent the lead control input amount of the position of the center of mass at time k and time k−1, respectively, Δt represents an interval time between time k and time k−1.

14. The non-transitory computer-readable storage medium of claim 11, wherein obtaining the desired ZMP of the robot at the current moment comprises:
   simplifying the robot into a linear inverted pendulum model, and calculating a planned capture point of the robot at the current moment according to planned values of the position of the center of mass and a velocity of the center of mass of the robot;
   calculating a measured capture point of the robot at the current moment according to measured values of the position of the center of mass and the velocity of the center of mass of the robot; and
   calculating the desired ZMP of the robot at the current moment according to the planned capture point and the measured capture point and based on a position relationship between a capture point and the ZMP of the robot, wherein the position relationship between the capture point and the ZMP of the robot is determined according to a preset relationship between the capture point and the position of the center of mass of the robot and a dynamic equation of the linear inverted pendulum model.

15. The non-transitory computer-readable storage medium of claim 12, wherein calculating the desired value of the motion state of the center of mass of the robot at the current moment based on the ZMP tracking control model, the desired ZMP and the actual ZMP, comprises:
   calculating the desired acceleration of the center of mass using the ZMP tracking control model according to a difference between the desired ZMP and the actual ZMP;
   integrating the desired acceleration of the center of mass to obtain the desired velocity of the center of mass; and
   integrating the desired acceleration of the center of mass twice to obtain the correction amount of the position of the center of mass.

16. The non-transitory computer-readable storage medium of claim 11, wherein the second mass block is a virtual block used for introducing acceleration.

17. The non-transitory computer-readable storage medium of claim 11, wherein the second mass block is determined according to a phase deviation between a desired trajectory and an actual trajectory of the robot when control the robot to walking.

18. The non-transitory computer-readable storage medium of claim 11, wherein the desired ZMP is calculated by gait planning, and the actual ZMP is measured by a six-dimensional force/torque sensor or pressure sensors.

19. The non-transitory computer-readable storage medium of claim 14, the planned capture point of the robot at the current moment is calculated by a following equation:

$$\xi_{plan} = x_{plan} + \frac{\dot{x}_{plan}}{\omega},$$

where, $\xi_{plan}$ represents a position of the planned capture point, $\omega$ represents a natural frequency of a linear inverted pendulum, and $x_{plan}$ and $\dot{x}_{plan}$ represent the planned value of the position of the center of mass of the robot and the planned value of the velocity of the center of mass of the robot, respectively.

20. The non-transitory computer-readable storage medium of claim 19, wherein the measured capture point of the robot at the current moment is calculated by a following equation:

$$\xi_{measure} = x_{measure} + \frac{\dot{x}_{measure}}{\omega},$$

where, $\xi_{measure}$ represents a position of the measured capture point, w represents the natural frequency of the linear inverted pendulum, $x_{measure}$ and $\dot{x}_{measure}$ represent the measured value of the position of the center of mass of the robot and the measured value of the velocity of the center of mass of the robot, respectively.

* * * * *